A. MAINZER.
COLLAPSIBLE TRUCK.
APPLICATION FILED JUNE 2, 1913.
1,198,383.
Patented Sept. 12, 1916.
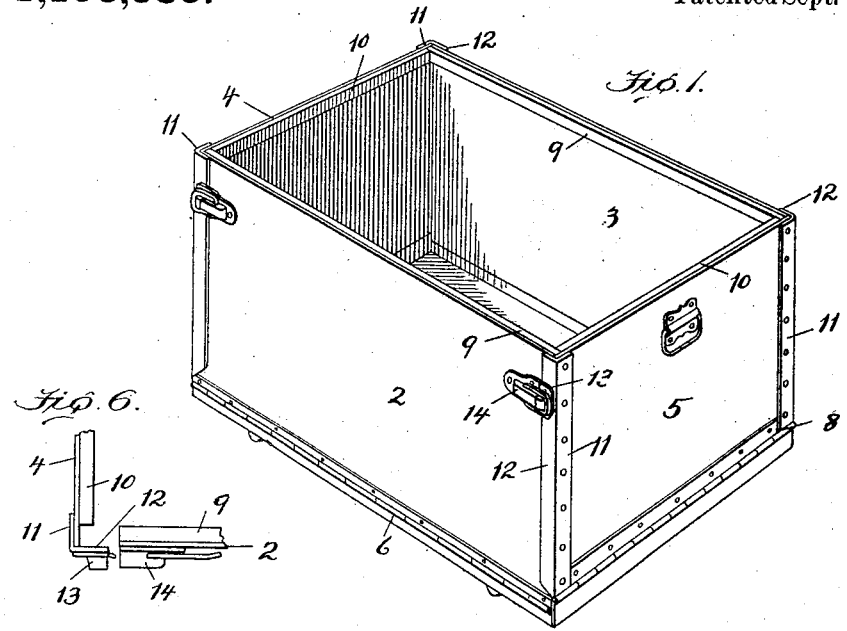
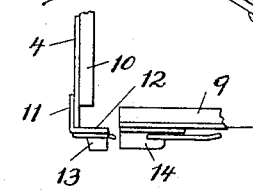
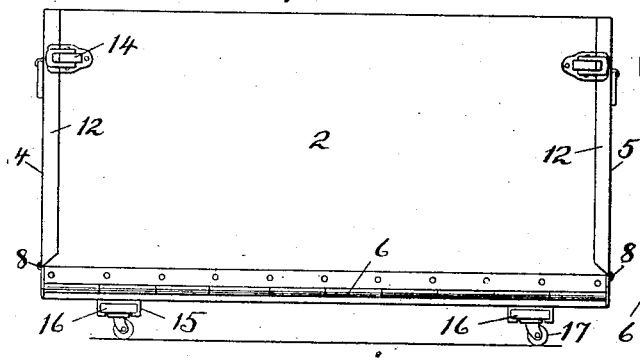
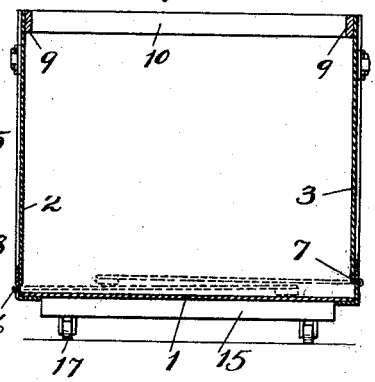
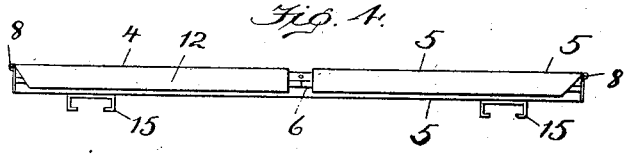
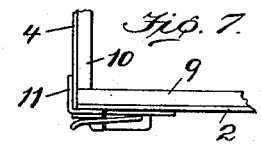
Witnesses
Edwin L. Bradford
G. Ferd. Vogt
Inventor
Adolf Mainzer
By
Mann & Co.
Attorneys

UNITED STATES PATENT OFFICE.

ADOLF MAINZER, OF BALTIMORE, MARYLAND, ASSIGNOR OF ONE-HALF TO WILLIAM J. MANN, OF BALTIMORE, MARYLAND.

COLLAPSIBLE TRUCK.

1,198,383.  Specification of Letters Patent.  Patented Sept. 12, 1916.

Application filed June 2, 1913. Serial No. 771,137.

*To all whom it may concern:*

Be it known that I, ADOLF MAINZER, a subject of the Emperor of Germany, residing at Baltimore, in the State of Maryland, have invented certain new and useful Improvements in Collapsible Trucks, of which the following is a specification.

This invention relates to improvements in collapsible trucks and has reference to a truck particularly useful in mercantile establishments for receiving lots of merchandise, for example during the filling of an order for a customer, or for keeping together lots of merchandise for transporting from one place to another during manufacture.

In large establishments a great many trucks or receptacles are required and the difficulty experienced is in providing ample space for storage of the trucks when not in actual use.

The present invention therefore has for its object to provide an improved construction of truck which may be collapsed and folded so as to effect material economies in space during storage and which will be light in weight, strong and rigid while in use.

With these and other objects in view the accompanying drawing illustrates the invention, wherein,—

Figure 1, shows a truck in perspective and in condition for use the same embodying the features of the invention. Fig. 2, illustrates the truck in side elevation. Fig. 3, shows a vertical cross-sectional view of the improved truck. Fig. 4, illustrates the truck in the collapsed condition. Fig. 5, shows a cross-sectional detail of the folded or collapsed truck on a somewhat enlarged scale. Fig. 6, illustrates in top plan one of the corner joints on a somewhat enlarged scale, the joint being separated, and Fig. 7, shows another detail of one fastened-together corner joint.

Referring to the drawing by numerals, 1, designates the bottom of the receptacle; 2, and, 3, the opposite side walls and, 4, and, 5, respectively the end walls. The bottom and the side and the end walls of the truck are formed of thin light material, such as fiber, so as to reduce the thickness and minimize the weight.

A hinge, 6, is provided along one longitudinal side edge of the bottom and another hinge, 7, is similarly located at the opposite edge of said bottom. By preference, these hinges, 6, and, 7, are of such construction that the pintle of hinge, 6, will be somewhat closer to the bottom than the pintle of hinge, 7,—this construction serving a useful purpose in folding as will presently be explained. The hinge, 6, pivotally sustains the lower edge of side wall, 2, while the hinge, 7, serves to pivotally sustain the side wall, 3. The precise construction of the hinges is not material but I prefer to use a hinge similar to that shown and known as a piano hinge because it affords a support and connection all along the pivoted edge of the side walls and prevents bulging of the walls at the bottom. The end walls, 4, and, 5, are pivotally connected to the bottom by means of hinges, 8, whose pintles have position in a horizontal plane above the pintles of the side wall hinges. It will thus be understood that the pivot for one side wall will be closer to the bottom than the pivot for the other side wall and that the pivots for the end walls will preferably be slightly higher than the pivot for either side wall. This arrangement of hinge pivots will obviously enable the side wall, 2, to be turned inwardly and laid on the bottom; the other side wall, 3, then turned inwardly and laid on the side wall, 2, in a compact manner and will further enable the end walls, 4, and, 5, to be turned inwardly and be laid on top of the side wall, 3.

At the upper free edge each side wall has a longitudinal reinforce strip or bar, 9, which is of the same length as said walls, as shown in Figs. 1, 6 and 7, and the upper free edge of each end wall is also provided with a reinforce strip or bar, 10, which latter is shorter than said end walls. These strips or bars are attached to the inner surfaces of the side and end walls so that when said walls are turned vertically, and brought together, the strips or bars, 10, on the end walls will extend between the ends of the strips, 9, on the side walls. Each vertical edge of the end walls, 4, and, 5, has an angle strip, 11,—one surface of the angle being laid against the outer vertical face of the end wall and the other face, 12, of each angle engaging the outer vertical face of the side wall. It will therefore be understood that when the side and end walls are turned upright, the strip or bar, 10, on the end wall will engage the inner side of the strip or bar, 9, on the side wall and thereby prevent the side wall from swinging inwardly, and at the same time the face, 12, of the angle strip carried by the end wall will project on the side of the side wall and will prevent said side wall from bulging outwardly. To secure the walls in the upright position I provide a two part fastening, one member, 13, of the fastening being secured to the face, 12, of the angle strip and the other member, 14, thereof being secured to the side wall adjacent to said angle strip. By means of these fastenings the end walls will be locked to the side walls and the latter will be braced by the end walls against inward or outward pressure by means of the strips, 10, on the inside and the angle plate surface, 12, on the outside. The bottom, 1, of the receptacle has a plurality of metal channel bars, 15, on its under side and a caster block or bar, 16, preferably of wood, having casters, 17, thereon can be slid into and out of said channel bars at will. These casters enable the truck to be readily rolled about from one place to another.

Having thus described my invention what I claim and desire to secure by Letters Patent is:—

1. A foldable truck having a bottom, two side walls of different vertical dimension, two end walls of the same vertical dimension and each wall having a hinge to pivotally connect it with the said bottom; a reinforce stop bar along the upper inner side of each side wall; a reinforce stop bar along the upper inner edge of each end wall said reinforce stop bars on the end walls limiting the inward movement of the side walls and said reinforce stop bars on the side walls providing a stop for the end walls and means on the outside of said walls to prevent them swinging outwardly.

2. A foldable truck having a bottom, two side walls of different vertical dimension, two end walls of the same vertical dimension and each of said walls having a hinge to pivotally connect it with said bottom; a reinforce stop bar along the upper inner side of each side wall; a reinforce stop bar along the upper inner edge of each end wall,—the stop bars on the end walls being shorter than the latter and the stop bars on the side walls being substantially the same length as the latter whereby the end wall stops will limit the inward movement of the side walls and the side wall stops will limit the inward movement of the end walls; means carried on the outside of two of said walls for holding the other two walls against outward movement and means on said other two walls for engaging said holding means to prevent said first-named two walls from swinging outwardly.

In testimony whereof I affix my signature in presence of two witnesses.

ADOLF MAINZER.

Witnesses:
 Louis C. Klerlein,
 G. Ferd. Vogt.

Copies of this patent may be obtained for five cents each, by addressing the "Commissioner of Patents, Washington, D. C."